United States Patent
Rolland

(10) Patent No.: US 6,857,355 B2
(45) Date of Patent: Feb. 22, 2005

(54) FILTER-HOLDER FOR ESPRESSO COFFEE MACHINE

(75) Inventor: Jacky Rolland, Saint Martin de Fontenay (FR)

(73) Assignee: SEB S.A., Ecully (FR)

( * ) Notice: Subject to any disclaimer, the term of this patent is extended or adjusted under 35 U.S.C. 154(b) by 39 days.

(21) Appl. No.: 10/333,457

(22) PCT Filed: Jul. 17, 2001

(86) PCT No.: PCT/FR01/02319
§ 371 (c)(1),
(2), (4) Date: Jun. 25, 2003

(87) PCT Pub. No.: WO02/07576
PCT Pub. Date: Jan. 31, 2002

(65) Prior Publication Data
US 2004/0103796 A1 Jun. 3, 2004

(30) Foreign Application Priority Data
Jul. 26, 2000 (FR) .......................................... 00 09816

(51) Int. Cl.⁷ ............................................. A47J 31/06
(52) U.S. Cl. .......................... 99/302 R; 99/319; 99/323
(58) Field of Search ............................. 99/302 R, 323, 99/307, 306, 318, 319, 284

(56) References Cited

U.S. PATENT DOCUMENTS

| 5,870,943 A | * | 2/1999 | Levi et al. ..................... 99/287 |
| 6,012,379 A | * | 1/2000 | Matuschek .................... 99/323 |
| 6,192,786 B1 | * | 2/2001 | Gasser et al. .................. 99/319 |

FOREIGN PATENT DOCUMENTS

| FR | 2 766 346 | 1/1999 |
| NL | 7 706 110 | 12/1978 |

* cited by examiner

Primary Examiner—Reginald L. Alexander
(74) Attorney, Agent, or Firm—Young & Thompson

(57) ABSTRACT

A filter-holder includes a cylindrical cup (1), a filtering chamber (4) defined by the inner side wall (5) of the cup and a perforated base (6) provided with a grille (7), a vessel (9) collecting the infusion placed underneath the grille (7) and provided with elements for evacuating the infusion (11), and at least two infusion, outlet pipes (15, 16). The filter-holder includes an infusion dispensing trough (10) placed beneath the vessel (9) which includes elements channelling (13, 35) the infusion flow towards the filter-holder outlet pipes. A selecting member (S1, S2) generates a relative rotational motion between the vessel (9) and the trough (10) to obtain an infusion flow either through one outlet pipes only (15), or through both outlet pipes (15, 16).

11 Claims, 4 Drawing Sheets

FILTER-HOLDER FOR ESPRESSO COFFEE MACHINE

CROSS REFERENCE TO RELATED APPLICATION

This is the 35 USC 371 national stage of International Application PCT/FR01/02319 filed on Jul. 17, 2001, which designated the United States of America.

FIELD OF THE INVENTION

The present invention relates to a filter-holder adapted to be mounted on a coffee machine of the espresso type. This type of filter-holder comprises a cylindrical cup provided with a sleeve, a filtration chamber delimited by the internal sidewall of the cup and a perforated bottom provided with a grille, a bowl for collecting the infusion disposed below the grille of the perforated bottom and provided with outlet means. The outlet for the infusion takes place through at least two outlet pipes located on the lower surface of the filter-holder.

BACKGROUND OF THE INVENTION

The invention relates more particularly to a filter-holder permitting preparing one or two cups of coffee.

Conventionally there is used a filter-holder with an outlet to prepare a cup of coffee, and if it is desired to prepare simultaneously two cups, there is used another filter-holder provided with two outlets. This multiplies the number of accessories and requires the following operations: removing the first filter-holder from the machine, storing it, using a second filter-holder.

Another solution consists in using a single filter-holder provided with two outlet pipes. To prepare a single cup, the user must place the cup precisely below the two outlet pipes to collect the two flows of coffee. The drawback of this solution resides in the positioning of the cup. If the cup is not perfectly disposed below the outlet pipes, the coffee flows to one side or along the edge of the cup. To prepare two cups, the user places the cups side by side below the filter-holder, each cup being below one outlet pipe. But in this case the distribution of the coffee into the cups is not always identical.

SUMMARY OF THE INVENTION

The invention has particularly for its object to provide a filter-holder which permits preparing one or two cups of coffee while eliminating the drawbacks described above.

According to the invention, the filter-holder comprises a distribution pan for the infusion, disposed below the collecting bowl and comprising means for channeling the flow of the infusion toward the outlet pipes of the filter-holder, and a selection member adapted to cause a movement of relative rotation between the bowl and the pan between two positions:

a two-cup position permitting selecting the channeling means which direct the flow of the infusion toward both the outlet pipes;
 a one-cup position permitting selecting the channeling means which direct the flow toward a single outlet pipe.

Thanks to the invention, there is obtained a single filter-holder which easily permits obtaining one or several flows of infusion to prepare one or several cups. Moreover, this result is obtained without the use of a faucet or sealed valve which requires precision machining and increases the cost of production.

According to another important characteristic of the invention, the filter-holder comprises a device for adjusting in height the perforated bottom, actuated by a selection member. Said height adjustment device comprises, between the lower portion of the cup and the perforated bottom, a stack of coaxial crown and counter-crown provided on their confronting surfaces with an alternate series of ramps and staged regions such that the rotation of the selection member gives rise to a movement of relative rotation between the crowns to vary the height of the perforated bottom in the cup between two positions:

a two-cup position in which the perforated bottom occupies a low position;
 a one-cup position in which the perforated bottom occupies a high position.

In the high position, the perforated bottom defines a reduced volume for the filtration chamber. This reduced volume can receive, either a dose of groups corresponding to the preparation of one cup, or a compacted grounds cartridge of the Illy (trademark) type.

On the other hand, the low position of the perforated bottom defines a greater filtration volume which can receive a quantity of grounds corresponding to the preparation of at least two cups.

Thus, the filter holding section member permits obtaining simultaneously, either a single flow and a reduced filtration volume, or else two flows and a greater filtration volume.

BRIEF DESCRIPTION OF THE DRAWINGS

Other characteristics and advantages of the invention will become apparent from the description which follows, given by way of non-limiting example, with reference to the accompanying drawings, in which.

DESCRIPTION OF THE PREFERRED EMBODIMENTS

Figure 1:
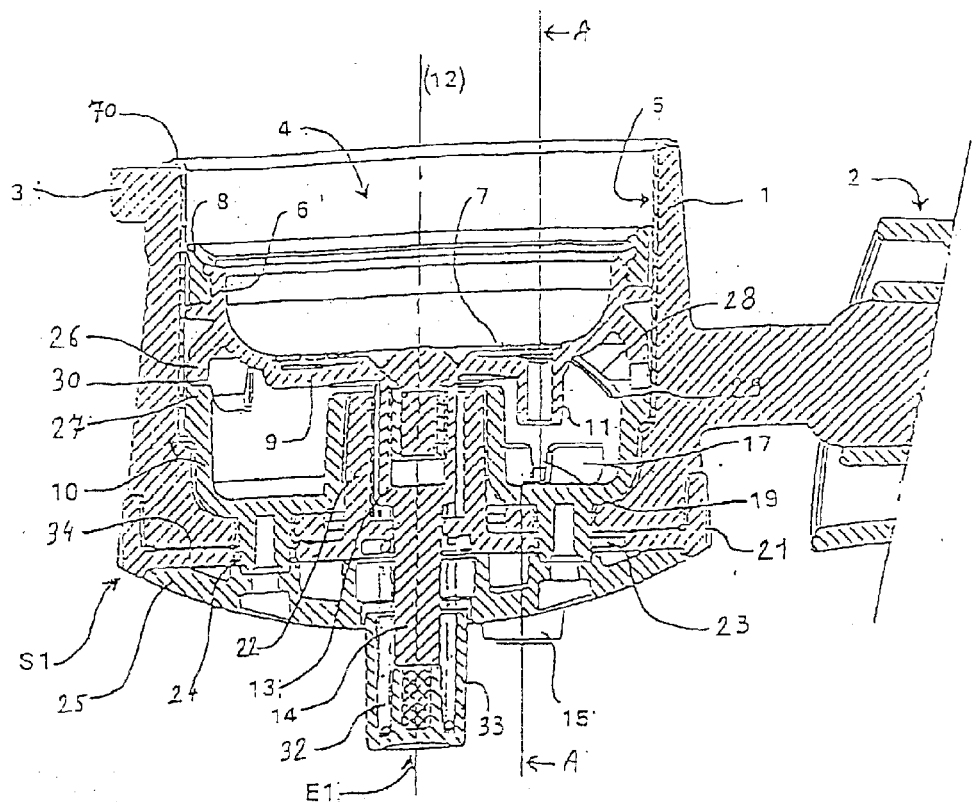
FIG. 1 is a cross-sectional view of a first embodiment of a filter-holder according to the invention, in which the filter-holder is in the two-cup position.

FIGS. 1 to 4 show a filter-holder according to a first embodiment.

This filter-holder comprises a cylindrical cup (1) provided with a sleeve (2). The mouth of the cup is adapted to be secured to the head of a coffee machine of the "espresso" type (not shown). This securement is effected by a bayonet connection of which an element (3) can be seen in FIG. 1. It is through this mouth that the hot water under pressure arrives from the coffee machine.

The filter-holder comprises a filtration chamber (4) adapted to receive the grounds. This filtration chamber is delimited by the lateral internal wall (5) of the cup, and a perforated bottom (6) provided with a grille (7) adapted to retain the grounds. The sidewall of the cup can be provided with a skirt (70). The perforated bottom (6) is movable in translation and in rotation relative to the cup (1) along a vertical axis (12). The seal between the perforated bottom (6) and the skirt (70) is ensured by an annular joint (8).

A bowl (9) is disposed below the grille (7) of the perforated bottom (6) to collect the infusion and comprises a tube (11) serving as an outlet means for the infusion. In this preferred embodiment, the perforated bottom (6) and the bowl (9) form only a single piece to obtain a less costly construction. The tube (11), substantially vertical, is disposed eccentrically relative to the axis (12) of rotation and preferably on the periphery of the bottom of the bowl (9). The bottom of the bowl (9) is prolonged along its axis of rotation (12) by a square drive member (13) and a shaft (14).

The lower part of the filter-holder comprises at least two outlet pipes (15, 16) for the infusion below which the user places one or several cups.

Figure 2:
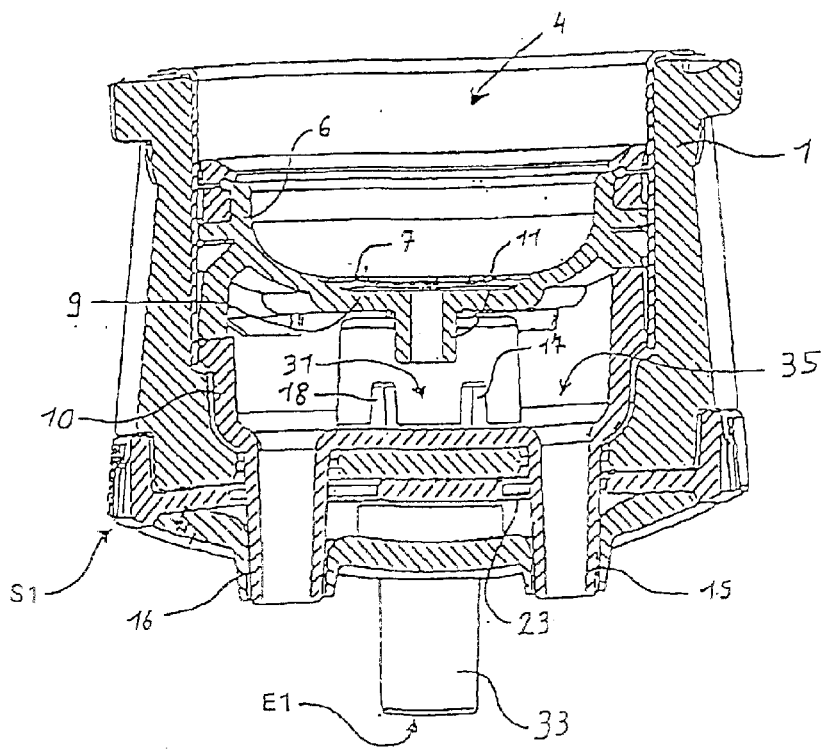
FIG. 2 is an enlarged view on the line A—A of FIG. 1.
Figure 3:
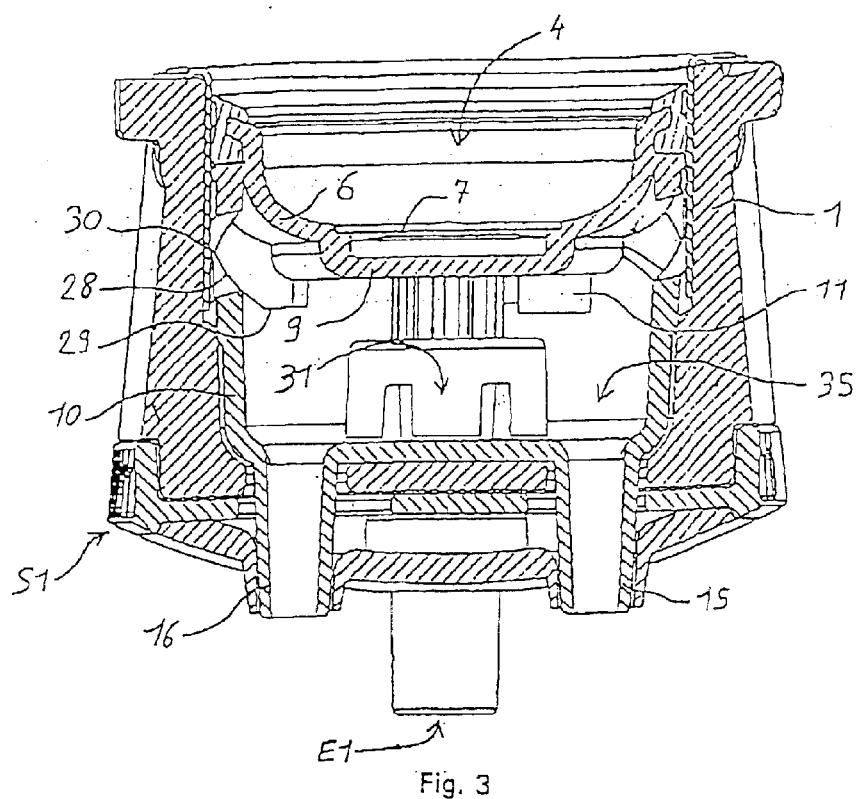
FIG. 3 is a view similar to that of FIG. 2, in which the filter-holder is in a one-cup position.

According to the invention, a pan (10) for distribution of the infusion is disposed below the bowl (9). The annular shape with a U-shaped vertical cross-section of the pan (10) lets pass through the shaft (14) and the driving square member (13) of the bowl (9). This pan is fixed relative to the cup (1) of the filter-holder. The bottom of the distribution pan (10) is connected to the outlet pipes (15, 16) as shown in FIGS. 2 and 3.

The distribution pan (10) comprises means for channeling the flow toward one or all of the outlet pipes (15, 16). These channeling means for the flow comprise two zones (31, 35).

Figure 4:
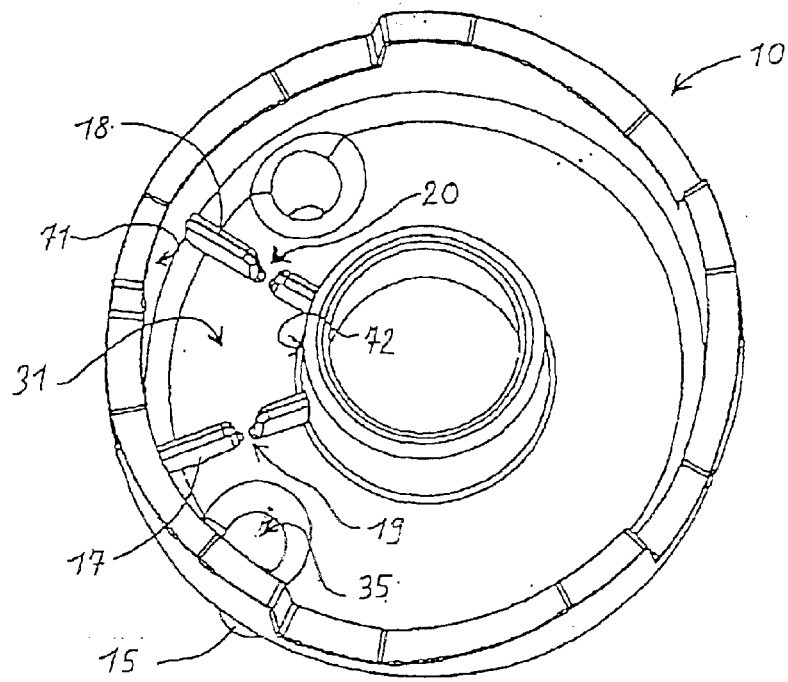
FIG. 4 is a perspective view of a distribution pan according to the first embodiment on an enlarged scale.

A first zone (31), located between the two outlet pipes (15, 16), is delimited by a partition having passages (19, 20) which open adjacent the outlet pipes (15, 16). As shown in FIG. 4, said partition is delimited by two radial ribs (17, 18) and the internal walls (71, 72) of the U-shaped section of the pan (10). The passages (19, 20) can be calibrated so as better to distribute the flow of the infusion toward the outlet pipes. Similarly, the channeling of the flow from the passages (19, 20) toward the outlet pipes (15, 16) can be improved by providing a depression about the opening of each outlet pipe (15, 16). This depression can be provided by a truncated conical portion forming a funnel between the bottom of the pan (10) and the outlet pipe. The first zone (31) thus defined permits directing the flow toward all the outlet pipes.

A second zone (35) is defined by the inlet opening of an outlet pipe (15) and permits directing the flow only toward this outlet pipe (15). This zone (35) can be extended about the outlet pipe (15) by a depression such as that described above.

A selection member (S1) permits causing a relative rotational movement between the collection bowl (9) and the distribution pan (10) between two positions:
 a first so-called two-cup position, to prepare two cups but which permits more generally preparing a number of cups equal to the number of outlet pipes of the filter-holder;
 a second position called a one-cup position, to prepare a single cup of infusion.

To cause the relative rotational movement, the selection member (S1) comprises a disk (34) provided with a peripheral manipulation ring (21) and with a central squared sleeve member (22) which drives the bowl (9) in rotation by means of its drive square (13), the distribution pan (10) being fixed relative to the cup (1). The selection disk (34) comprises openings in the arc of a circle (23, 24) to let pass the outlet pipes (15, 16) and securement screws for the lower cover (25).

In the two-cup position, shown in FIG. 2, the outlet means for the bowl (9), which is to say the tube (11), is located below the channeling means for the pan, defined by the first zone (31), which directs the flow toward all the outlet pipes (15, 16). The hot water supplied by the machine passes through the filtration chamber (4) to form an infusion. This infusion is collected by the bowl (9) and flows by gravity, through the tube (11), into the first zone (31) of the pan (10). The two calibrated passages (19, 20) separate the infusion into two flows and channel these flows toward the openings of the two outlet pipes (15, 16). There are thus obtained two flows at the outlet of the filter-holder below which two cups can be placed.

In the one-cup position, shown in FIG. 3, the outlet tube (11) for the bowl (9) is located above the channeling means, defined by the second zone (35), which directs the flow only toward the outlet pipe (15). The infusion collected by the bowl (9) thus flows substantially directly from the tube (11) through the outlet pipe (15). There is thus obtained a flow from only one of the outlet pipes of the filter-holder below which can easily be placed one cup.

In a preferred embodiment, the opening (23) in the arc of a circle is defined such that its ends come into abutment with the outlet pipes (15, 16) in the two end positions of the disk (34) of the selection member. The user carries out a rotation of about 45° of the selection ring (21) to pass from one position to the other.

According to another important characteristic of the invention, the filter-holder comprises a device to vary the height of the perforated bottom (6) in the cup (1). This device comprises between the lower portion of the cup (1) and the perforated bottom (6) a stack of a crown (26) and a counter crown (27) that are coaxial and provided on their facing surface with an alternate series of ramps (28) and staged regions (29, 30) such that the rotation of the selection member (S1), described above, causes relative rotational movement between the crowns (26, 27) to vary the height of the perforated bottom (6) of the cup (1) Such an arrangement is described in greater detail in French application 96 00883 of the applicants. The crown (26) is held in contact with the counter crown (27) by means of resilient return means (32) disposed between the selection disk (34) and a button (33) secured to the shaft (14) of the bowl. The resilient return means (32) can be constituted by a compression spring. In the embodiment described, the crown (26) forms a portion of the lower surface of the perforated bottom (6) and the counter crown (27) forms a portion of the upper surface of the distribution pan (10). This permits limiting the number of pieces necessary for production of the filter carrier.

The rotation of the ring (21) of the selection member (S1) from the two-cup position to the one-cup position gives rise to the passage of the perforated bottom (6) from a low position (FIGS. 1 and 2) to a high position (FIG. 3).

There is thus obtained a single filter-holder which permits, by simple action on the selection member (S1), to pass alternatively from one configuration with two outlets for the infusion and a large filtration volume, to a configuration with a single outlet for the infusion and a reduced filtration volume. This reduced filtration volume can receive a quantity of grounds corresponding to the preparation of one cup, or a cartridge of compacted grounds of the Illy (trademark) type.

According to another preferred characteristic of the invention, the filter carrier comprises an ejection member (E1) actuated by pressure on the button (33). This pressure has the effect of compressing the resilient return means (32) and to raise the perforated bottom (6) by means of the shaft (14). There is thus obtained a device to facilitate the ejection of the grounds after infusion.

Figure 5:
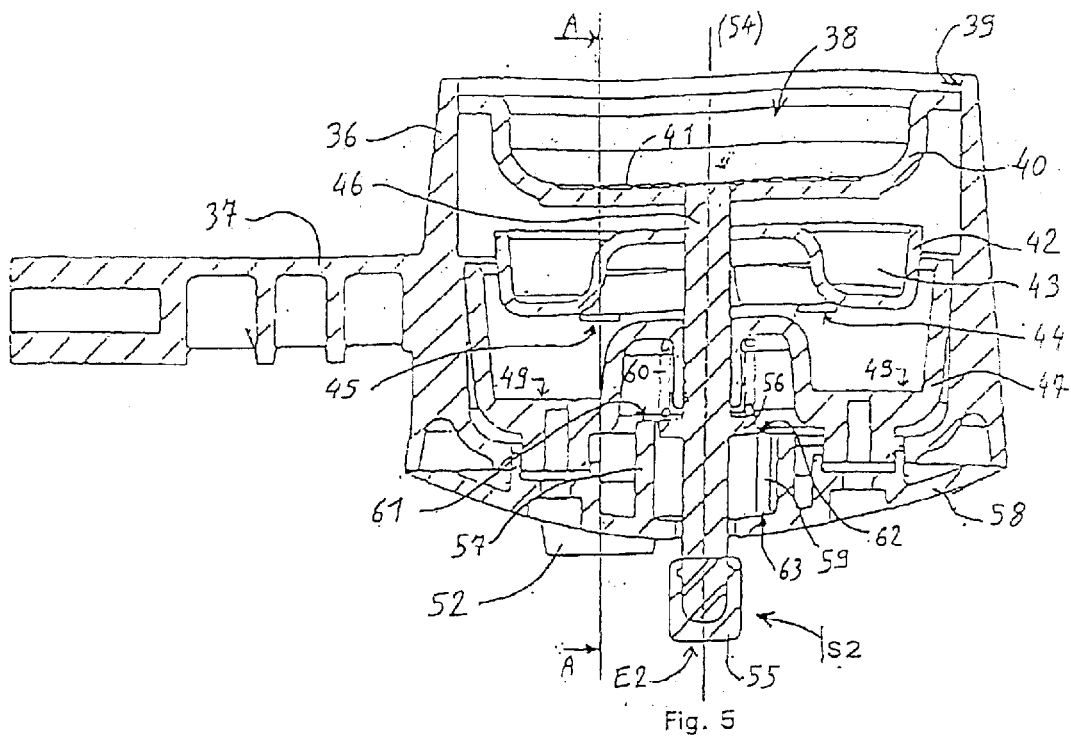
FIG. 5 is a cross-sectional view of a second embodiment of a filter-holder according to the invention, in which the filter-holder is in a one-cup position.
Figure 6:
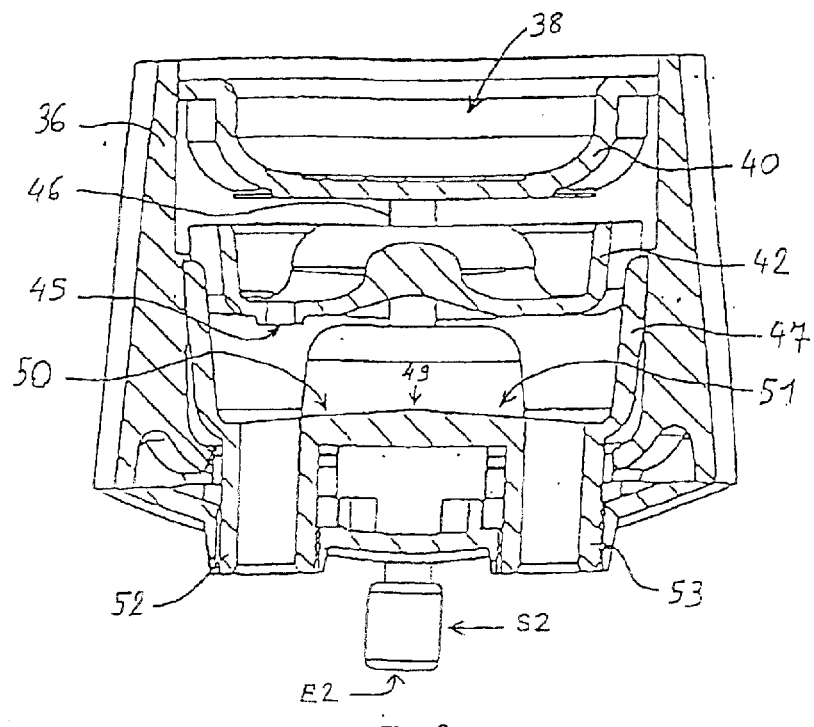
FIG. 6 is a view on the line A—A of FIG. 5.
Figure 7:
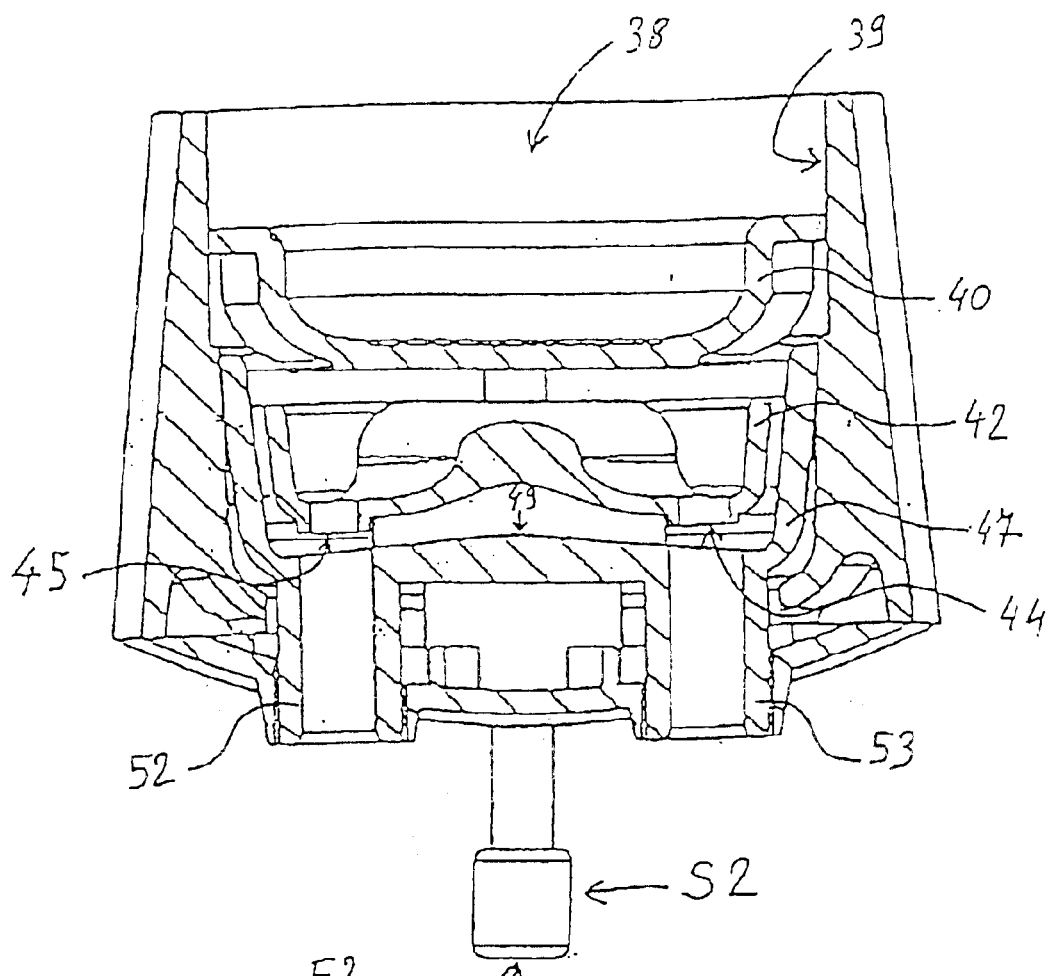
FIG. 7 is a view similar to that of FIG. 6, in which the filter-holder is in the two-cup position.

A second embodiment of a filter-holder according to the invention is shown in FIGS. 5, 6 and 7.

The filter-holder comprises a cylindrical cup (36) with a vertical axis (54) provided with a sleeve (37), a filtration chamber (38) delimited by the internal sidewalls (39) of the cup (36) and by a perforated bottom (40) provided with a grille (41).

A bowl (42) is disposed below the grille (41) of the perforated bottom (40) to collect the infusion. The bowl has the shape of a disk provided with a peripheral throat (43) with a vertical U-shaped section provided with two openings (44, 45). These openings constitute the evacuation means for the infusion and are disposed on opposite sides of a diagonal of the bowl. The bowl (42) is movable in rotation relative to the cup (36) and is fixed on a shaft (46). To obtain a perforated bottom (40) movable as to height, the latter can be fixed on the shaft (46). In this case, the shaft (46) is movable in rotation and in translation relative to the cup (36) along the vertical axis (54).

The lower portion of the filter-holder is provided with at least two outlet pipes for the infusion (52, 53) passing through a cover (58) fixed to the cup (36) by screws (not shown).

According to the invention, a distribution fan (47), disposed below the bowl (42), is formed by a ring with a vertical U-shaped cross-section permitting the passage of the shaft (46). This pan is fixed relative to the cup (36).

The channeling means for the flow to the bottom of the pan (47) comprise two inclined planes (50, 51) connected by a summit ridge (49) along a diameter of the pan. In FIG. 5, this summit ridge (49) is in the plane of the cross-sectional view. As shown in FIG. 6, the inclined planes (50, 51) are provided in their lower portion with openings which communicate with the outlet pipes (52, 53). There is thus obtained two channeling means (50, 51) each directing the flow toward one outlet pipe.

A selection member (S2) permits causing a relative rotational movement between the collection bowl (42) and the distribution pan (47).

To cause the relative rotational movement, the selection member (S2) comprises, in addition to the axle (46), a manipulation button (55), and a quarter turn cam (56) adapted to bear against the upper edge of a tubular element (57) formed on the internal surface of the cover (58). A resilient means (60), such as a spring, disposed between the lower surface of the distribution pan (47) and the upper surface of the cam (56), holds the latter in contact with the tubular element (57) in two different angular positions. According to a preferred characteristic, the tubular element can comprise a projection (61) in the arc of a circle on which the cam (56) cannot bear. This projection (61) thus defines two abutments for the two angular positions of the cam (56).

According to another important characteristic of the invention, the selection member (S2) permits varying the height of the perforated bottom (40) in the cup (36). To do this, the tubular element (57) comprises an upper region (62) and a lower region (63) located at the bottom of a throat (59) in which the cam (56) can bear. Thus the selection member (S2) permits placing the perforated bottom (40) in two positions at different heights.

In the two-cup position, shown in FIG. 7, the cam (56) bears against the lower region (63) of the tubular element (57) and occupies an angular position in which each orifice (44, 45) of the bowl (42) is disposed above an inclined plane (50, 51) of the pan (47). This angular position permits selecting the two channeling means (50, 51) which direct the flow toward the two outlet pipes. There is thus simultaneously obtained:

two flows of the infusion from the two openings (44, 45) of the bowl which are channeled by the two inclined planes (50, 51) toward the two outlet pipes (52, 53) of the filter-holder;

a lower position of the perforated bottom (40) which permits obtaining a large filtration volume.

In the one-cup position, shown in FIGS. 5 and 6, the cam (56) bears against the upper region (62) of the tubular element (57) and occupies an angular position in which the two openings (44, 45) of the bowl (42) are disposed above a single inclined plane (50) of the pan (47). This angular position permits selecting the channeling means (50) which directs the flow toward one single outlet pipe (52). There is thus obtained simultaneously:

a flow of the infusion from the two openings (44, 45) of the bowl which is channeled by an inclined plane (50, 51) toward one single outlet pipe (52) of the filter-holder;

an upper position of the perforated bottom (40) which permits obtaining a reduced filtration volume.

The filter-holder thus permits, by a simple action on the selection member (S2), passing alternatively from one configuration with two outlets for the infusion and a large filtration volume, to a configuration with a single outlet for the infusion and a reduced filtration volume.

Preferably, the filter-holder comprises an ejection member (E2) actuated by vertical pressure on the button (55). The space between the upper surface of the cam (56) and the bottom of the pan (47), is sufficient to permit mounting of the ejection member (E2) which compresses the resilient return means (60) and causes to vary the height of the perforated bottom (40) in the cup (36). This rising of the perforated bottom permits facilitating the ejection of the grounds after the infusion operation. In this embodiment, the ejection member (E2) is merged with the selection member (S2).

What is claimed is:

1. Filter-holder to be mounted on a coffee machine, comprising:

a cylindrical cup provided with a sleeve;

a filtration chamber delimited by an internal sidewall of the cup and a perforated bottom provided with a grille;

a bowl to collect an infusion disposed below the grille of the perforated bottom and provided with infusion evacuation means and at least two outlet pipes for the infusion;

a distribution pan for distributing the infusion disposed below the collection bowl and comprising channeling means for channeling the flow of the infusion toward the outlet pipes; and a selection member adapted to cause relative rotational movement between the bowl and the distribution pan between two positions:

a two-cup position permitting selecting the channeling means which direct the flow of the infusion toward all the outlet pipes; and a one-cup position permitting selecting the channeling means which direct the flow toward a single outlet pipe.

2. The filter-holder according to claim 1, wherein the evacuation means comprise a tube located on the bottom of the bowl eccentrically, and the channeling means comprise a first zone located between the outlet pipes and delimited by a partition having two calibrated passages toward the outlet pipes, a second zone defined by the inlet opening of an outlet pipe, the selection member comprising a peripheral ring which drives an rotation the collection bowl via a disk between the two positions:

the two-cup position, in which the tube of the bowl is located above the first zone of the distribution pan; and the one-cup position, in which the tube of the bowl is located above the second zone of the distribution pan.

3. The filter-holder according to claim 1, wherein the evacuation means comprise two openings located on opposite sides of a diagonal of the bowl, and the channeling means comprise two inclined planes whose intersection forms a summit ridge along a diagonal of the distribution pan, each inclined plane being provided in its lower portion with an opening which communicates with an outlet pipe, and the selection member drives in rotation the collection bowl via a shaft between the two positions:

the two-cup position, in which each opening of the bowl is disposed above an inclined plane; and the one-cup position, in which the two openings of the bowl are located above a single inclined plane.

4. The filter-holder according to claim 1, wherein the perforated bottom is movable as to height; and the bowl comprises between its lower portion and the perforated bottom a stack of a crown and a counter crown that are coaxial and provided on their facing surfaces with an alternate series of ramps and staged regions such that the rotation of the selection member gives rise to a relative rotational movement between the crown to vary the height of the perforated bottom in the cup.

5. The filter-holder according to claim 4, wherein the crown forms a portion of the lower surface of the perforated bottom, and the counter crown forms a portion of the upper surface of the distribution pan.

6. The filter-holder according to claim 1, wherein the perforated bottom is movable as to height, and the bottom of the cup comprises a tubular element provided with an upper region and a lower region, the selection member fixed to the perforated bottom comprises a cam adapted to be held bearing against said tubular element via a resilient means in two positions:

a first position in which the cam bears against the lower region of the tubular element; and a second position in which the cam bears against the upper region of the tubular element.

7. The filter-holder according to claim 4, wherein the selection member places the perforated bottom in the two positions:

the two-cup position, in which the perforated bottom occupies a lower position; and the one-cup position, in which the perforated bottom occupies an upper position.

8. The filter-holder according to claim 1, wherein the perforated bottom is movable as to height; the filter-holder further comprising an ejection member connected to the perforated bottom via a shaft and held in a rest position by a resilient return means; said ejection member being movable along the vertical axis of the cup such that pressure on the latter raises the perforated bottom to facilitate ejection of grounds.

9. The filter-holder according to claim 3, wherein the perforated bottom is movable as to height, and the bottom of the cup comprises a tubular element provided with an upper region and a lower region, the selection member fixed to the perforated bottom comprises a cam adapted to be held bearing against said tubular element via a resilient means in two positions:

a first position in which the cam bears against the lower region of the tubular element; and a second position in which the cam bears against the upper region of the tubular element.

10. The filter-holder according to claim 5, wherein the selection member places the perforated bottom in the two positions:

the two-cup position, in which the perforated bottom occupies a lower position; and the one-cup position, in which the perforated bottom occupies an upper position.

11. The filter-holder according to claim 6, wherein the selection member places the perforated bottom in the two positions:

the two-cup position, in which the perforated bottom occupies a lower position; and the one-cup position, in which the perforated bottom occupies an upper position.

* * * * *